(12) United States Patent
Moon et al.

(10) Patent No.: US 8,059,598 B2
(45) Date of Patent: Nov. 15, 2011

(54) WIRELESS COMMUNICATION SYSTEM AND METHOD FOR MANAGING SERVICE FLOW IDENTIFIER IN THE SAME

(75) Inventors: Jung-Mo Moon, Seoul (KR); Sang-Ho Lee, Daejeon (KR)

(73) Assignees: Samsung Electronics Co., Ltd; Electronics and Telecommunications Research Institute; KT Corporation (KR); SK Telecom Co., Ltd; Hanaro Telecom., Inc

( * ) Notice: Subject to any disclaimer, the term of this patent is extended or adjusted under 35 U.S.C. 154(b) by 1042 days.

(21) Appl. No.: 11/636,784

(22) Filed: Dec. 11, 2006

(65) Prior Publication Data
US 2007/0153685 A1 Jul. 5, 2007

(30) Foreign Application Priority Data
Dec. 10, 2005 (KR) .................. 10-2005-0121340

(51) Int. Cl.
*H04W 4/00* (2009.01)
(52) U.S. Cl. ........ 370/331; 370/310; 370/328; 370/338; 455/435.1; 455/436; 455/438
(58) Field of Classification Search .......... 455/436–450, 455/435.1–435.3, 421, 466, 418; 370/229–235, 370/328–338, 238
See application file for complete search history.

(56) References Cited

U.S. PATENT DOCUMENTS

| | | | | |
|---|---|---|---|---|
| 7,251,226 | B2 * | 7/2007 | Lindsay et al. | 370/331 |
| 7,596,115 | B1 * | 9/2009 | Lohtia et al. | 370/328 |
| 2002/0003804 | A1 * | 1/2002 | Hjalmtysson et al. | 370/410 |
| 2003/0002459 | A1 * | 1/2003 | Igarashi et al. | 370/330 |
| 2003/0099214 | A1 * | 5/2003 | Schmidt et al. | 370/328 |
| 2005/0037768 | A1 | 2/2005 | Hwang et al. | |
| 2005/0122905 | A1 | 6/2005 | Jung | |
| 2005/0147062 | A1 * | 7/2005 | Khouaja et al. | 370/332 |
| 2006/0111111 | A1 * | 5/2006 | Ovadia | 455/439 |
| 2006/0209768 | A1 * | 9/2006 | Yan et al. | 370/338 |
| 2008/0186925 | A1 * | 8/2008 | Cheng et al. | 370/338 |

* cited by examiner

*Primary Examiner* — Kamran Afshar
*Assistant Examiner* — Kathy Wang-Hurst
(74) *Attorney, Agent, or Firm* — The Farrell Law Firm, P.C.

(57) ABSTRACT

The present invention relates to a wireless communication system and a service flow identifier method of the system. The wireless communication system includes a plurality of PARs that provides wireless communication services to a plurality of access terminals through a plurality of access points for separate management of service flow identifiers. The PARs include a service flow identifier controller for managing a service flow identifier used for identifying a connection service of each access terminal. The service flow identifier controller manages a service flow identifier generated by a home PAR and a service flow identifier generated by another PAR among service flow identifiers of an access terminal that has performed handoff from the other PAR to the home PAR. The wireless communication system manages service flow identifiers by using a separate control method, thereby preventing interruption of the entire system network operation due to a signal system error.

21 Claims, 7 Drawing Sheets

FIG.4

| Home ID table(1231) | | | | |
|---|---|---|---|---|
| Unique ID | State | Age | Prev. Index | Next Index |
| | | | | |
| | | | | |
| ... | | | | |
| | | | | |

0
1

65535

| Visitor ID table(1233) | |
|---|---|
| Service flow ID | State |
| | |
| | |
| ... | |
| | |

0
1

Max

WIRELESS COMMUNICATION SYSTEM AND METHOD FOR MANAGING SERVICE FLOW IDENTIFIER IN THE SAME

PRIORITY

This application claims priority to and the benefit of Korean Patent Application No. 10-2005-0121340 filed in the Korean Intellectual Property Office on Dec. 10, 2005, the contents of which are incorporated herein by reference.

BACKGROUND OF THE INVENTION

1. Field of the Invention

The present invention relates to a service flow identifier management method, and more particularly, relates to an apparatus for managing a service flow identifier in a wireless communication system, and a method thereof.

2. Description of the Related Art

A broadband wireless access (BWA) system that supports a portable Internet (e.g., WiBro) or IEEE 802.16 provides Internet services with various levels of quality of service (QoS) to a user with low speed mobility. Such a system uses a connection identifier and a service flow identifier to transmit a control message and user data between a mobile station and a base station. The connection identifier is an identifier uniquely allocated to each connection in one base station.

The mobile terminal and the base station determine a destination of a packet based on the connection identifier of a received packet in a radio network. When the mobile station performs handoff while receiving a service from a current base station to a new base station, the new base station generates a new connection identifier for the corresponding mobile station terminal and allocates the new connection identifier to the mobile station.

A service flow identifier is generated by a service flow identifier managing server upon a service request of the mobile station and is not changed when the mobile station performs handoff. The service flow identifier can be used as a unique identifier for determining a connection service of the mobile station. Such a service flow identifier is generated by a connection generation message and deleted by a connection release message transmitted from the mobile terminal.

A service flow identifier and a connection identifier have a 1:1 or 1:0 relationship. A packet access router (PAR) that controls a base station in a typical wireless communication system sets a QoS parameter set of dynamic service-related messages to a provision set when generating or changing a connection in a portable Internet system. In this case, a service flow identifier is allocated for the connection but a connection identifier is not allocated. However, when a connection between a service flow identifier and a connection identifier corresponds to an admitted set or an active set, the connection is allocated with resources including radio resources as well as a connection identifier.

As described above, the service flow identifier is a unique identifier that can determine connection establishment of one mobile station in one service provider network, and therefore, it needs to be separately managed. Conventionally, a service flow identifier is managed by a centralized method.

According to the centralized method, one service flow identifier managing server is provided in a network for managing all service flow identifiers. Therefore, the mobile station requests a service flow identifier from the service flow identifier managing server when establishing a connection with each base station, and requests service flow identifier deletion from the server when releasing the connection.

Although the centralized service flow identifier managing method can efficiently manage service flow identifiers, the number of control messages transmitted for service flow identifier management is increased and an error in one service flow identifier managing server may affect the overall system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wireless communication system having advantages of efficiently managing service flow identifiers by separately managing service flow identifiers without increasing the number of control messages for the management there of, and a service flow identifier managing method of the system. In addition, the wireless communication system is robust against system errors.

An exemplary wireless communication system according to one embodiment of the present invention includes a plurality of access points and a plurality of packet access routers (PARs). The plurality of access points control a plurality of access terminals in a radio network. The plurality of PARs provide wireless communication services to the plurality of access terminals through the plurality of access points. Each of the PARs includes a service flow identifier controller for managing a service flow identifier. The service flow identifier is used for identifying a connection service of each of the plurality of access terminals. The service flow identifier controller manages a service flow identifier generated by a home PAR to which the service flow identifier controller belongs and a service flow identifier generated by another PAR among service flow identifiers of an access terminal that has performed handoff from the other PAR to the home PAR.

An exemplary method according to another embodiment of the present invention manages a service flow identifier. The method includes receiving a to generate of a service flow identifier of an access terminal by a PAR that provides a wireless communication service to the access terminal through an access point, the service flow identifier being used for identifying a connection service of the access terminal; generating by the PAR a service flow identifier to be allocated to the access terminal among unused flow identifiers; and allocating by the PAR the generated service flow identifier to the access terminal through the access point.

Another exemplary method according to another embodiment of the present invention manages a service flow identifier. The method includes determining if an access terminal performs handoff from another PAR to a home PAR, a PAR providing a wireless communication service to the access terminal through an access point; when the handoff to the home PAR is performed, determining by the PAR if a service flow identifier of the access terminal is generated by the home PAR; and when it is determined that the home PAR has generated the service flow identifier, setting a storing state of the service flow identifier stored in the home PAR to a state value indicating that the access terminal is located in the home PAR.

Another exemplary method according to another embodiment of the present invention manages a service flow identifier. The method includes: determining if an access terminal performs handoff from a home PAR to another PAR, a PAR providing a wireless communication service to the access terminal through an access point; when the handoff to the another PAR is performed, determining by the home PAR if a service flow identifier of the access terminal is generated from the home PAR; and when it is determined that the home PAR has generated the service flow identifier, setting a storing state of the service flow identifier stored in the home PAR to a state value indicating that the access terminal performed handoff to the another PAR.

A further exemplary method according to another embodiment of the present invention manages a service flow identifier. The method includes receiving by a home PAR a service flow identifier deletion request, a PAR providing a wireless communication service to an access terminal through an access point; determining by the home PAR if the deletion-requested service flow identifier is generated by the home PAR; and when it is determined that the home PAR generated the deletion-requested service flow identifier, deleting the service flow identifier stored in the home PAR.

A still further exemplary method according to another embodiment of the present invention manages a service flow identifier. The method includes receiving by the home PAR a de-registration request from an access terminal, a PAR providing a wireless communication service to the access terminal through an access point; determining by the home PAR if a service flow identifier of the access terminal that has received the de-registration request is generated by the home PAR; and when it is determined that the service flow identifier is generated by the home PAR, deleting the service flow identifier stored in the home PAR.

BRIEF DESCRIPTION OF THE DRAWINGS

The above and other objects, features and advantages of the present invention will become more apparent from the following detailed description, take in conjunction with the accompanying drawings, in which:

FIG. 4 is a configuration block diagram of an identifier table of FIG. 2; and

DETAILED DESCRIPTION OF THE PREFERRED EMBODIMENTS

Figure 1:
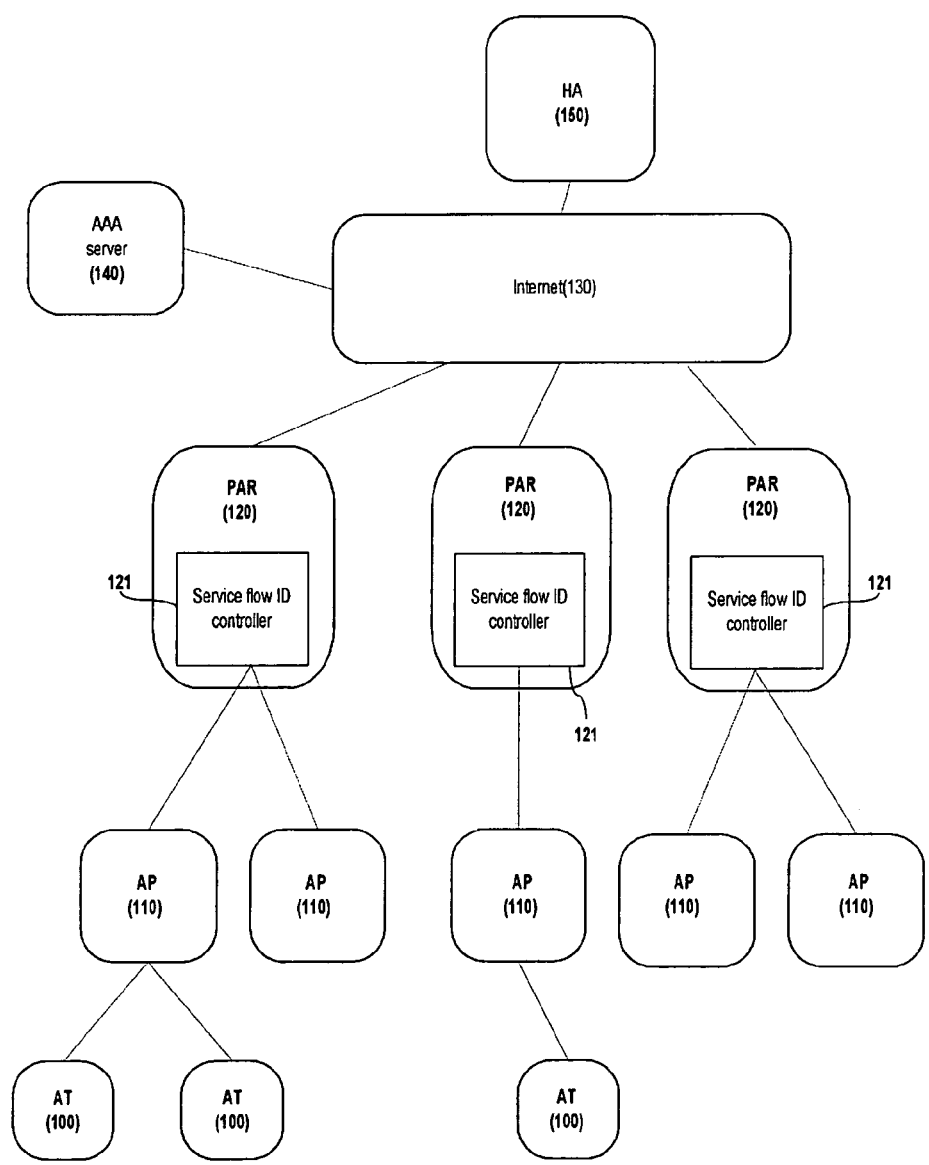
FIG. 1 is a diagram illustrating a wireless communication system to which a service flow identifier controller according to an exemplary embodiment of the present invention is applied.

In the following detailed description, only certain preferred embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the drawings, "ID" is short for "identifier".

FIG. 1 is a diagram illustrating a wireless communication system to which a service flow identifier controller according to an exemplary embodiment of the present invention is applied.

As shown in FIG. 1, the wireless communication system is provided as a portable Internet system.

The portable Internet system includes a plurality of access terminals (ATs) 100, a plurality of access points (APs) 110, a plurality of access point controllers 120, an authentication, authorization and accounting (AAA) server 140 connected with an Internet 130, and a home agent (HA) 150. The access point controller will be referred to as a packet access router (PAR).

The AT 100 installs an application program therein, and receives a desired packet service while moving between cells in a currently serving AP 110, between the plurality of APs 110, and between the plurality of PARs 120.

The AP 110 controls and manages a plurality of ATs 100 in a radio network of a corresponding location.

The PAR 120 is connected to the HA 150 and the AAA server 140 through the Internet 130, and is configured in a hierarchical structure for managing the plurality of APs 110 in a centralized manner. In addition, the PAR 120 controls radio resource states of a plurality of cells and controls call admission for providing quality of service (QoS).

The AAA server 140 accesses the PAR 120 through the Internet 130, and provides a user authenticating function for a corresponding service by using a specific authentication protocol.

The HA 150 accesses the PAR 120 through the Internet 130, and manages IP mobility of the AT 100 so that the AT can receive a packet service while moving.

The respective PARs 120 include a service flow identifier controller 121 for managing the generation/deletion of a service flow identifier and managing a state of a service flow identifier in one service provider network.

Each of the PARs 120 can manage a service flow identifier in a separate network environment by using a service flow identifier controller 121 included in each of the PARs 120.

Figure 2:
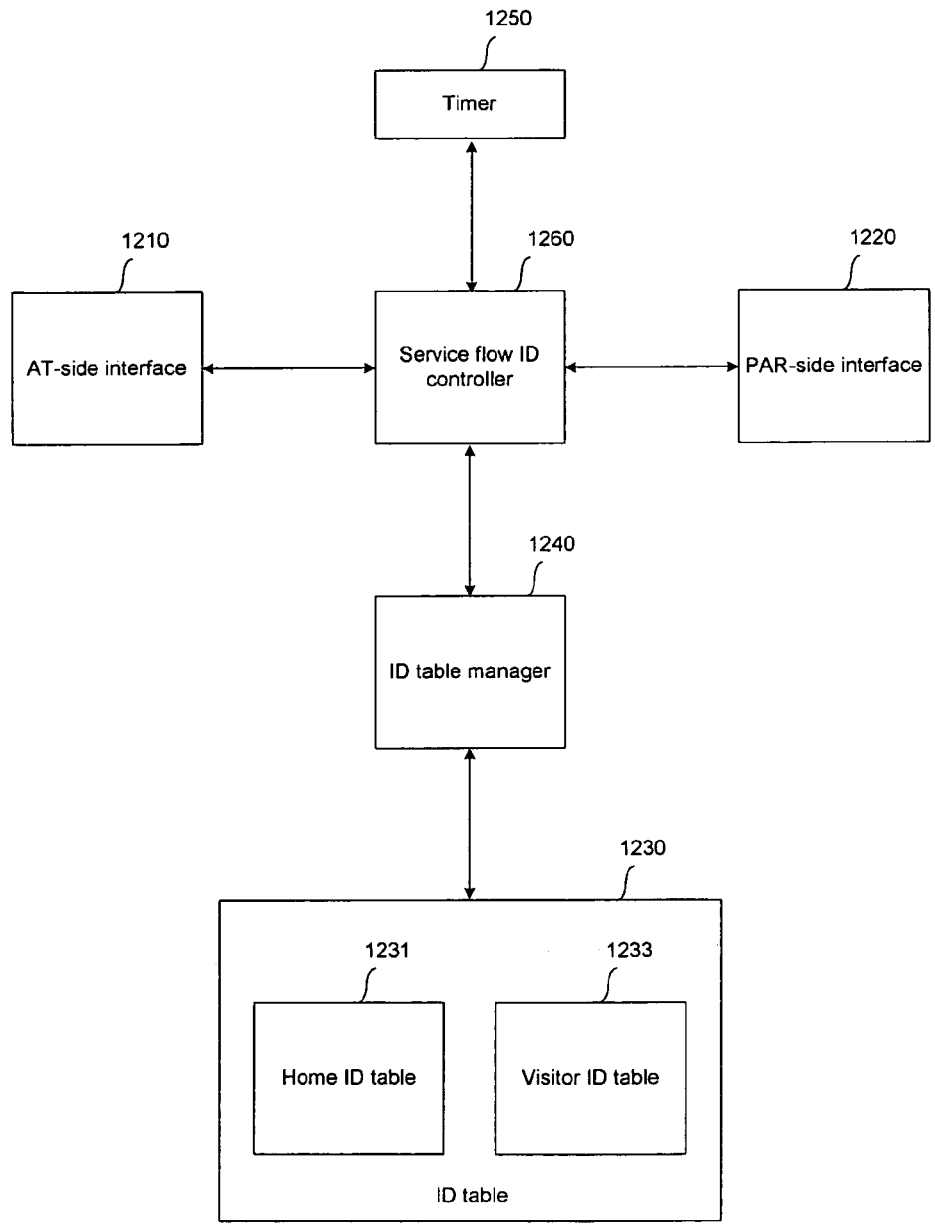
FIG. 2 is a block diagram of the service flow identifier controller according to an exemplary embodiment of the present invention.

FIG. 2 is a block diagram of a service flow identifier controller according to the exemplary embodiment of the present invention.

As shown in FIG. 2, the service flow identifier controller includes an AT-side interface 1210, a PAR-side interface 1220, an identifier table 1230, an identifier table manager 1240, a timer 1250, and a service flow identifier controller or controlling unit 1260.

The AT-side interface 1210 provides the AT 100 with an interface for transmitting/receiving a message for controlling a service flow identifier to/from the AT 100.

The PAR-side interface 1220 provides the PAR 120 with an interface for transmitting/receiving a message for controlling service flow identifiers of ATs 200 that performed handoff between PARs to/from another PAR.

The identifier table 1230 stores all service flow identifiers managed by the PAR 120.

The identifier table 1230 includes a home identifier table 1231 and a visitor identifier table 1233.

The home identifier table 1231 stores a service flow identifier generated by a first PAR 120 where the home identifier table 1231 is included.

The visitor identifier table 1233 stores a service flow identifier generated by another or second PAR 120. That is, the visitor identifier table 1233 stores a service flow identifier of an AT 100 visiting the PAR 120 by performing handoff from the other PAR 120. Herein, the service flow identifier of the AT 100 has been generated by the other PAR 120.

The identifier table manager 1240 manages the identifier table 1230 to generate or delete a service flow identifier or change a state of the service flow identifier.

The timer 1250 measures time for preventing error in service flow identifier allocation due to internal system errors or occurrence of an abnormal state of a radio link.

The service flow identifier controlling unit 1260 transmits/receives a message to/from the AP 100 through the AT-side interface 1210, transmits/receives a message to/from another PAR 120 through the PAR-side interface 1220, generates/manages/deletes a service flow identifier through the identifier table manager 1240, and measures a time for managing service flow identifier allocation through the timer 1250.

Figure 3:
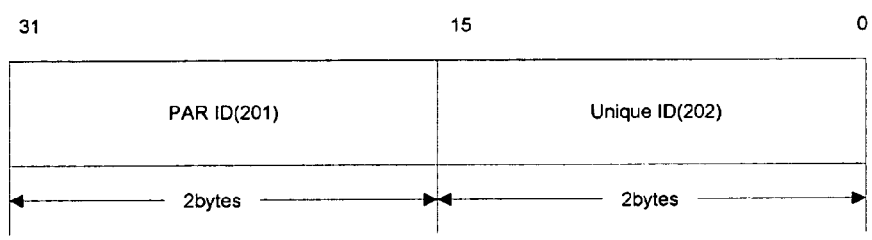
FIG. 3 is a diagram of a service flow identifier used in the service flow identifier controller according to the exemplary embodiment of the present invention.

FIG. 3 is a configuration diagram of a service flow identifier used in the service flow identifier controller according to the exemplary embodiment of the present invention.

As shown in FIG. 3, the service flow identifier controller 121 the present invention uses a service flow identifier having a length of 4 bytes.

The two most significant bytes among the 4-byte service flow identifier are used for a PAR identifier 210 to identify a PAR 120 that has generated the corresponding service flow identifier, and the two least significant bytes are used for a unique identifier 202 that identifies a unique value in the PAR 120 at the time that the PAR 120 generates the corresponding service flow identifier. That is, the service flow identifier is formed of the PAR identifier 201 and the unique identifier 202, and the PAR identifier 201 is used to select a table for storing and managing the service flow identifier among the home identifier table 1231 and the visitor identifier table 1233.

When service flow identifiers are allocated by one PAR 120, the allocated service flow identifiers respectively have the same PAR identifier 210 and respectively have a different unique identifier 202 within a range of 0 to 65535.

Therefore, a service flow identifier has a unique value within one service provider network in a separate processing environment. In addition, the service flow identifier controller 121 can identify which PAR generates each service flow identifier with reference to a PAR identifier 201 of the corresponding service flow identifier.

FIG. 4 is a block diagram of the identifier table of FIG. 2.

As shown in FIG. 4, the identifier table 1230 includes the home identifier table 1231 and the visitor identifier table 1233.

The service flow identifier controller 121 of the PAR 120 separates service flow identifiers into the home identifier table 1231 and the visitor identifier table 1233 and separately manages the service flow identifiers.

The home identifier table 1231 manages a service flow identifier generated by a PAR 120 where the home identifier table 1231 is included. Since the PAR that generated the service flow identifier stored in the home identifier table 1231 is the PAR 120 in which the home identifier table 1231 is included, the two most significant bytes (i.e., PAR identifier, 201) do not need to be managed, and therefore only the two least significant bytes (i.e, unique identifier 202) are managed. That is, the size of a home identifier table 1231 that corresponds to a service flow identifier to be managed can be reduced.

Such a home identifier table 1231 includes a unique identifier field, a state field, and an age field, and is configured as a double linked list data structure formed of the previous index and the next index. The double linked list uses a unique identifier as a key for an available resource.

The double linked list supports simple insertion of information on a resource having a value within a predetermined range (e.g., 0 to 65535) and efficient deletion of given information within a relatively short time.

The state field of the home identifier table 1231 has a first state value T, a second state value H, and a third state value V. The first state value T indicates that a service flow identifier is being currently allocated, the second state value H indicates that an AT 100 is located in a corresponding PAR 120, and the third state value V indicates that an AT 100 allocated with a service flow identifier from a current PAR has performed handoff to another PAR and thus the service flow identifier is managed by the other PAR 120.

In addition, the home identifier table 1231 includes the age field for efficient management of service flow identifier information. A value of the age field is incremented by 1 (i.e., i++) with a constant time interval (e.g., every one minute). When a service flow identifier controller 121 of a PAR 120 generates a service flow identifier upon a service flow identifier generation request and allocates the generated service flow identifier to the AT 100, an error may occur in the allocation of the service flow identifier to the AT 100 due to an error between the AT 100 and the PAR 210 or an error in the radio network, and the age field is used to prevent the allocation error. The age field determines the occurrence of an error when a service flow identifier is not successfully allocated due to various system errors, and deletes the corresponding service flow identifier.

When the AT 100 allocated with a service flow identifier from another PAR 120 performs handoff to a current PAR 120, the visitor identifier table 1233 manages the corresponding service flow identifier.

The visitor identifier table 1233 includes a service flow identifier field and a state field, and a service flow identifier is used as a key for management. The service flow identifier is managed by using a hashing method since the service flow identifier has a vast range.

The state field of the visitor identifier table 1233 includes a state value V and a service flow identifier release request (SFID Release_Request) value. The state value V indicates that a corresponding service flow identifier is in an active state when the AT 100 is visiting the current PAR 120 from the other PAR 120, and the service flow identifier release request value indicates that a release request (Release_Request) message is transmitted to a PAR that has allocated the service flow identifier to request release of the corresponding service flow identifier when the AT 100 performs handoff back to the other PAR 120 from the current PAR 120.

Figure 5A:
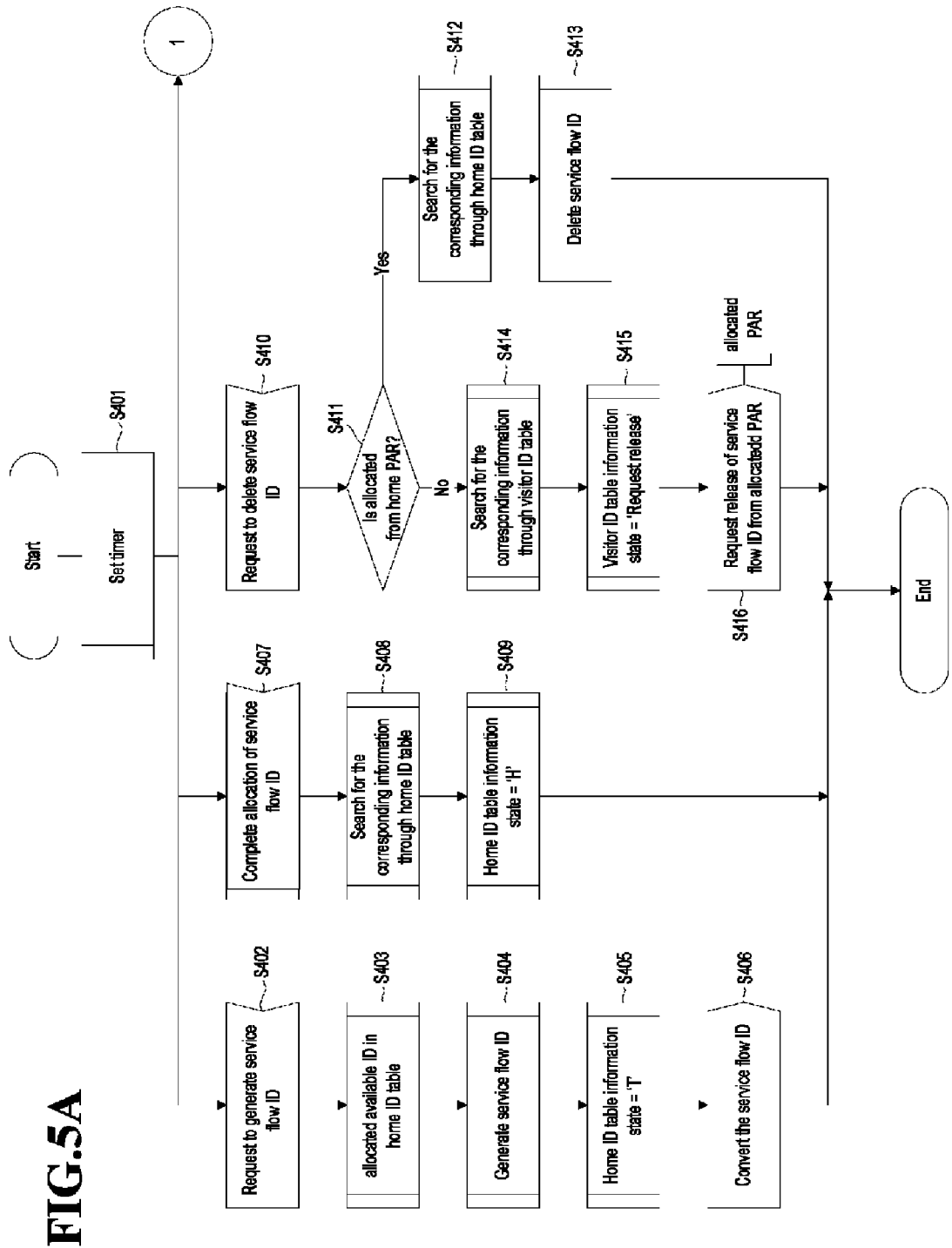
FIG. 5A to FIG. 5C are flowcharts showing a control process of the service flow identifier in the wireless communication system according to the exemplary embodiment of the present invention.
Figure 5B:
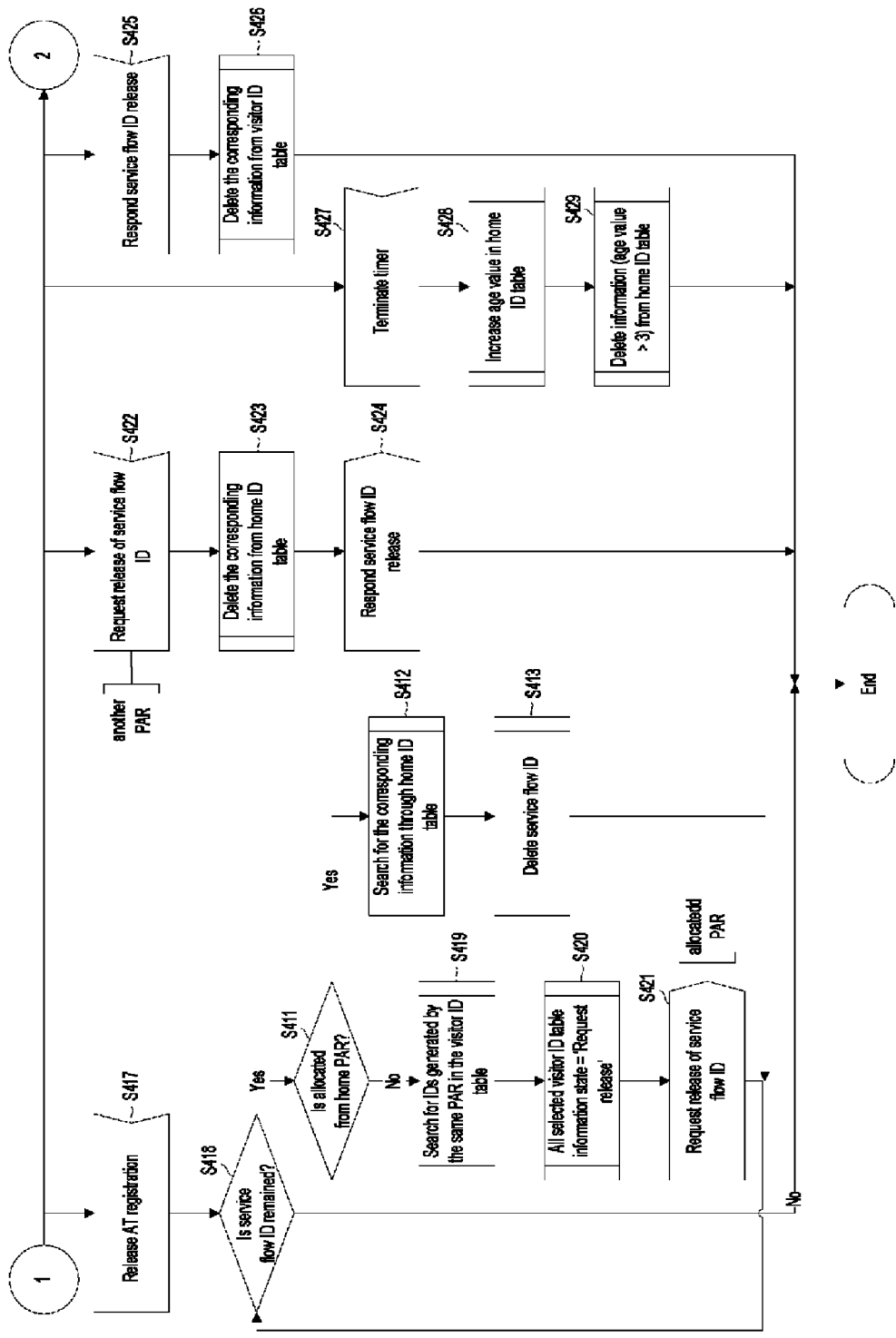
Figure 5C:
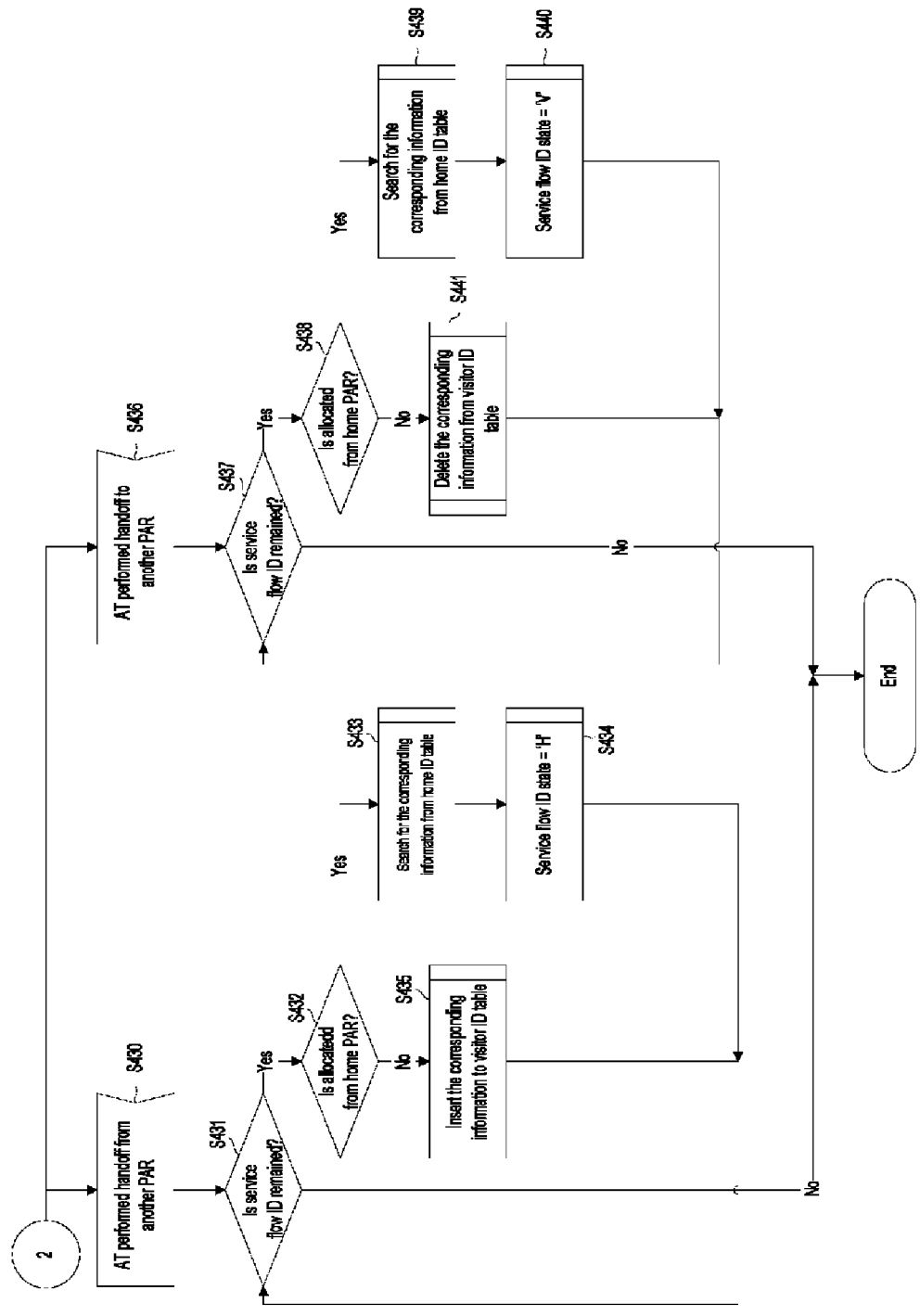

A method for controlling a service flow identifier according to the exemplary embodiment of the present invention will be described with reference to FIG. 5A to FIG. 5C.

Service flow identifier generation and allocation will be described with reference to FIG. 5A.

In order to prevent an error from occurring in service flow identifier allocation due to a radio link error, in step S401 the service flow identifier controlling unit 1260 sets a timer for periodic operation in an initial stage.

A message for connection establishment includes a dynamic service addition (DSA) message, a dynamic service change (DSC) message, and a dynamic service deletion (DSD) message.

Such a connection establishment message can be triggered from the AT 100 or from the PAR 120.

When receiving a service flow identifier generation request message from the AT 100 through the AT-side interface 1210, in step S402, the service flow identifier controlling unit 1260 selects one available (i.e. unused) unique identifier 202 from the home identifier table 1231 and is allocated with the selected unique identifier 202 through the identifier table manager 1240 in step S403, and generates a service flow identifier by connecting the allocated unique identifier 202 with a corresponding PAR identifier 201, in step S404.

Subsequently in step S405, the service flow identifier controlling unit 1260 sets a state of the unique identifier 202 allocated from the home identifier table 1231 to the first state value T so as to indicate that a service flow identifier is being allocated.

In step S406 the service flow identifier controlling unit 1260 transmits the generated service flow identifier back to the AT 100 that has transmitted the generation request message.

When receiving a service flow identifier allocation complete message from the AT 100 through the AT-side interface 1210 in step 407, the service flow identifier controlling unit 1260 searches the information in the home identifier table 1231 by using the unique identifier 202 of the service flow identifier as an index in step S408, and changes the state value of the home identifier table 1231 to the second state value H in step S409.

Accordingly, service flow allocation operation for the AT 100 is terminated.

Service flow identifier deletion will be described with reference to FIG. 5A.

When receiving a service flow identifier delete request message through the AT-side interface 1210 in step S410, the service flow identifier controlling unit 1260 searches for a PAR identifier 201 of a deletion-requested service flow identifier and determines if the deletion-requested service flow identifier is allocated by a home PAR (a PAR of the service flow identifier controlling unit 1260) or by another PAR in step S411.

When the deletion-requested service flow identifier is allocated by the home PAR, in step S412 the service flow identifier controlling unit 1260 searches for the deletion-requested service flow identifier in the home identifier table 1231 by using the home identifier table 1231. A unique identifier 202 of the deletion-requested service flow identifier is used as a search key. When the deletion-requested service flow identifier is searched in the home identifier table 1231, in step S413 the service flow identifier controlling unit 1260 deletes the searched unique identifier 202 from the home identifier table 1231, and terminates the corresponding service flow deletion process.

When the deletion-requested service flow identifier is allocated by the other PAR, the service flow identifier controlling unit 1260 searches for a corresponding service flow identifier in the visitor identifier table 1233 through the identifier table manager 1240 with reference to a PAR identifier 210 of the deletion-requested service flow identifier in step S414, and sets a state field of searched service flow identifier in the visitor identifier table 1233 to SFID Release_Request in step S415.

Then in, in step S416 the service flow identifier controlling unit 105 transmits a service flow identifier release request message to the PAR 120 that has allocated the deletion-requested service flow identifier through the PAR-side interface 1220 with reference to a PAR identifier 201 of the searched service flow identifier.

The following process will be described with reference to FIG. 5B. When receiving a service flow identifier response message from the PAR that has allocated the corresponding service flow identifier through the PAR-side interface 1220 in step S425, the service flow identifier controlling unit 1260 searches for information on the corresponding service flow identifier in the visitor identifier table 1233 by using the corresponding service flow identifier as a key and deletes the searched information in step S426.

Through the above process, deletion of the deletion-requested service flow identifier is terminated.

A process for deleting a service flow identifier when releasing registration of the AT 100 will be described with reference to FIG. 5B.

When the PAR 120 receives a de-registration request message from the AT 100 and receives a service flow identifier deletion request through the AT-side interface 1210 in step S417, the service flow identifier controlling unit 1260 determines in step S418 if a remaining service flow identifier for the corresponding AT 100 exists.

When a service flow identifier of the AT that has requested de-registration corresponds to a service flow identifier allocated from the home PAR in step S411, the service flow identifier controlling unit 1260 searches for information on the service flow identifier in the home identifier table 1231 by using a unique identifier 202 of the service flow identifier as a key in step S412, and deletes the searched information so as to release the allocation of the service flow identifier in step 413.

When the service flow identifier of the AT 100 that has requested de-registration has been allocated from another PAR, the service flow identifier controlling unit 1260 searches the remaining service flow identifiers in the visitor identifier table 1233 to search for all service flow identifiers allocated from the same PAR in step S419.

After that, in step S420 the service flow identifier controlling unit 1260 sets state fields of all the searched service flow identifiers in the visitor identifier table 1233 to SFID Release_Request, and in step S421 transmits a service flow identifier release request message to the same PAR.

The subsequent processes are the same as steps S425 and S426, and therefore further descriptions will be omitted.

Through the above process, the service flow identifier deletion process during the de-registration process is terminated.

A process for detecting a corresponding service flow identifier upon a service flow identifier release request message will be described in more detail with reference to FIG. 5B.

When a home PAR that has allocated a service flow identifier receives a service flow identifier release request message from another PAR in step S422, the service flow identifier controlling unit 1260 of the service flow identifier controller of the home PAR searches for the release-requested service flow identifier in the home identifier table 1231 by using a unique identifier 202 of the release-requested service flow identifier as a key and deletes information on the searched service flow identifier in step S423. After that, in step S424 the service flow identifier controller 1260 transmits a response message for the received release request message back to the other PAR such that the deletion process of the separately managed service flow identifier is terminated.

When the timer 1250 set in step S401 is terminated in step S427, the service flow identifier controlling unit 1260 searches through information in the home identifier table 1231 and in step S428 increments a value of an age field of a unique identifier 202 whose state field is set to the first state value T by 1.

When a value of an age field in the home identifier table 1231 exceeds a specific threshold value (e.g., 3), in step S429 the corresponding unique identifier is deleted so as to prevent a service flow identifier allocation error from occurring due to an abnormal state of the radio network. The service flow identifier controlling unit 1260 periodically resets the timer 1250.

Through the above process, a state field of the corresponding unique identifier of the home identifier table 1231 can be prevented from being maintained in the first state value T even though a control message of a node or a radio network of the system is lost in the initial stage of the service flow identifier allocation.

A method for controlling a service flow identifier when a handoff occurs between PARs will be described with reference to FIG. 5C.

The case of performing handoff from another PAR to the home PAR 120 will be described.

When the AT 100 performs handoff from another PAR to the home PAR 120 in step S430, the service flow identifier controlling unit 1260 of the home PAR 120 checks a service flow identifier of the AT 100 in step S431.

After that, in step S432 the service flow identifier controlling unit 1260 determines if all service flow identifiers of the AT 100 are allocated from the home PAR 120.

When all the service flow identifiers of the AT 100 are allocated from the home PAR 120, this implies that the AT 100 performed handoff to the other PAR after having been allocated the service flow identifiers from the home PAR 120 and then performed handoff back to the home PAR 120.

Therefore, when the service flow identifiers are allocated from the home PAR 120, the service flow identifier controlling unit 1260 searches through information in the home identifier table 1231 in step S433 and in step S434 changes a state field of the searched unique identifier 202 to the second state value H.

When each of the service flow identifiers of the AT 100 is allocated from the PAR, the service flow identifier controlling unit 1260 inserts the corresponding service flow identifier information to the visitor identifier table 1233 and activates the corresponding state field to "V" in step S435.

The case of performing handoff from the home PAR 120 to another PAR will be described.

When AT 100 moves to another PAR while receiving services from the home PAR 120 in step S436, the service flow identifier controlling unit 1260 determines in step S437 if a remaining service flow identifier of the AT 100, which has performed handoff to the other PAR while receiving services from the home PAR 120, exists.

The service flow identifier controlling unit 1260 determines in step S438 if all service flow identifiers of the AT 100 are allocated from the home PAR 120.

When all the service flow identifiers are allocated from the home PAR 120, this implies that the AT 100 have been allocated with the service flow identifiers from the home PAR 120 and performs handoff to the other PAR.

Therefore, when the service flow identifiers are allocated from the home PAR 120, the service flow identifier controlling unit 1260 searches through information in the home identifier table 1231 in step S439 and changes a state field of the corresponding unique identifier 202 to the third state value V that indicating that the AT has performed handoff to the other PAR in step S440.

When the service flow identifiers of the AT 100 are allocated from another PAR, the service flow identifier controlling unit 1260 in step S441 searches through information in the visitor identifier table 1233 and deletes the searched service flow identifier information.

Through the above processes, separate management operation for the AP performing handoff between PARs is terminated.

As a result, when the AT 100 requests connection establishment or when the AT 100 performs handoff to another PAR, the service flow identifier controller of each PAR 120 manages service flow identifiers of the AT 100 by using the home identifier table 1231 and the visitor identifier table 1233 such that information on each service flow identifier can be separately managed by the plurality of PARs 120 by using the service flow identifier controlling method according to the exemplary embodiment of the present invention.

As described, a PAR of a wireless communication system, particularly, of a portable Internet system manages service flow identifiers of the AT by using a separate control method so that the number of control messages can be reduced compared to a centralized control method and system errors also can be reduced.

According to the above-described the exemplary embodiment of present invention, each of the service flow identifier controllers separately provided to each of the PARs classifies each service flow identifier into the home identifier table and the visitor identifier table, thereby achieving separate management of the respective service flow identifiers.

In addition, state information of a service flow identifier is transmitted to the home PAR by the service flow identifier controller of the visitor PAR only when the AT allocated with a service flow identifier from the home PAR performs a connection release in the visited PAR, thereby reducing the number of control messages for service flow identifier management.

Accordingly, the wireless communication system separately manages service flow identifiers so that the interruption of the overall system network operation due to a single system error can be prevented.

While this invention has been described in connection with what is presently considered to be practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A wireless communication system, comprising:
a plurality of access points for controlling a plurality of access terminals in a radio network; and
a plurality of packet access routers (PARs) for providing wireless communication services to the plurality of access terminals through the plurality of access points, each of the PARs comprising a service flow identifier controller for managing a service flow identifier that is used for identifying a connection service of each of the plurality of access terminals,
a timer controlled by the service flow identifier controller and measuring a time for preventing a service flow identifier allocation error due to system errors or an abnormal state of a radio network,
wherein the service flow identifier controller manages a service flow identifier generated by a home PAR to which the service flow identifier controller belongs and a service flow identifier generated by another PAR among service flow identifiers of an access terminal that has performed handoff from the another PAR to the home PAR,
wherein the service flow identifier comprises a PAR identifier for identifying a packet access router that has generated the service flow identifier,
wherein both the service flow identifier controller of the home PAR and the service flow identifier controller of the another PAR respectively manage service flow identifiers of the access terminal when the access terminal performs a handoff from the home PAR to the another PAR or when the access terminal performs a handoff from the another PAR to the home PAR, and wherein the service flow identifier controller of the home PAR changes a state of the service flow identifiers of the access terminal in response to the handoff of the access terminal from the home PAR to the another PAR or from the another PAR to the home PAR, and the service flow identifier controller of the another PAR generates the service flow identifiers of the access terminal in response to the handoff of the access terminal from the home PAR to the another PAR or deletes the service flow identifiers of the access terminal in response to the handoff of the access terminal from the another PAR to the home PAR.

2. The wireless communication system of claim 1, wherein when deleting a service flow identifier generated by the another PAR among service flow identifiers managed by the service flow identifier controller, the service flow identifier controller requests deletion of the service flow identifier from the another PAR that has generated the deletion-requested service flow identifier.

3. The wireless communication system of claim 1, wherein the service flow identifier controller comprises:

an access terminal-side interface for providing the access terminal with an interface through which the access terminal transmits/receives a service flow identifier control message to/from the access point;

a PAR-side interface for providing a PAR with an interface through which the PAR transmits/receives a message for controlling an access terminal that performs handoff between PARs to/from other PARs;

an identifier table for storing a service flow identifier managed by the PAR;

an identifier table manager for generating and deleting all service flow identifiers managed by the home PAR and changing a state of each of the service flow identifiers in the identifier table; and a service flow identifier controlling unit for controlling the access terminal-side interface, the PAR-side interface, and the identifier table manager to generate a service flow identifier managed by the home PAR, deletes the service flow identifier, changes a state of the service flow identifier, and interacting with a service flow identifier controller of at least one of the plurality of PARs to separately manage service flow identifiers between the plurality of PARs.

4. The wireless communication system of claim 3, wherein the identifier table comprises:

a home identifier table for storing and managing a service flow identifier generated by the home PAR; and a visitor identifier table for storing and managing a service flow identifier generated by at least one of the plurality of PARs among service flow identifiers of the access terminal that has performed handoff from the at least one of the plurality of PARs to the home PAR.

5. The wireless communication system of claim 4, wherein the home identifier table comprises:

a unique identifier field having a unique value in the home PAR;

a state field for indicating state information on a unique identifier stored in the unique identifier field; and an age field being incremented by one at a constant time interval to prevent an error from occurring when a service flow identifier is generated, wherein the home identifier table is configured as a double linked list formed of the previous index and the next index, the double linked list using the unique identifier field as a key for an available resource.

6. The wireless communication system of claim 5, wherein the state field comprises:

a first state value for indicating that a service flow identifier corresponding to a value of a corresponding unique identifier field is being allocated to the access terminal;

a second state value for indicating that the access terminal allocated with the service flow identifier corresponding to the value of the corresponding unique identifier filed is located in the home PAR; and a third state value for indicating that the access terminal allocated with the service flow identifier corresponding to the value of the corresponding unique identifier field performed handoff to other PARs.

7. The wireless communication system of claim 4, wherein the visitor identifier table comprises:

a service flow identifier field for storing a service flow identifier generated by other PARs among service flow identifiers of the access terminal that performed handoff from the other PARs to the home PAR; and a state field for indicating state information on the service flow identifier stored in the service flow identifier field, wherein the visitor identifier table uses a hash table that uses a service flow identifier as a key.

8. The wireless communication system of claim 7, wherein the state field comprises:

a service flow identifier release request state for indicating that deletion of a corresponding service flow identifier is requested to a PAR that has generated the corresponding service flow identifier so as to delete a service flow identifier stored in a corresponding service flow identifier field; and a service flow identifier activated state for indicating that a service flow identifier stored in the corresponding service flow identifier field is activated.

9. A method for managing a service flow identifier, the method comprising:

receiving a request to generate a service flow identifier of an access terminal by a home packet access router (PAR) that provides a wireless communication service to the access terminal through an access point, the service flow identifier being used for identifying a connection service of the access terminal;

generating by the home PAR a service flow identifier to be allocated to the access terminal among unused service flow identifiers;

allocating by the home PAR the generated service flow identifier to the access terminal through the access point, and managing the service flow identifier allocated to the access terminal and a service flow identifier allocated to a handoff access terminal by another PAR, the handoff access terminal having performed handoff from the another PAR to the home PAR, setting a timer that can measure a time before the generation of the service flow identifier, wherein, after the allocation of the service flow identifier to the access terminal, the method deletes the stored service flow identifier and terminates the service flow identifier generation when termination of the timer is repeated for a predetermined number of times, wherein both the home PAR and the another PAR respectively manage service flow identifiers of the access terminal when the access terminal performs a handoff from the home PAR to the another PAR or when the access terminal performs a handoff from the another PAR to the home PAR, and wherein the home PAR changes a state of the service flow identifiers of the access terminal in response to the handoff of the access terminal from the home PAR to the another PAR or from the another PAR to the home PAR, and the another PAR generates the service flow identifiers of the access terminal in response to the handoff of the access terminal from the home PAR to the another PAR or deletes the service flow identifiers of the access terminal in response to the handoff of the access terminal from the another PAR to the home PAR.

10. The method of claim 9, further comprising, between the generation of the service flow identifier and the allocation of the service flow identifier to the access terminal,
storing by the home PAR the generated service flow identifier, and setting by the PAR a corresponding storing state to a first state value indicating that the service flow identifier is being allocated to the access terminal.

11. The method of claim 10, wherein, after allocating the service flow identifier to the access terminal and before managing the service flow identifier allocated to the access terminal, the method further comprises:
receiving an allocation completion message for the service flow identifier from the access terminal; and
setting a storing state corresponding to the service flow identifier to a second state value and terminating the generation of the service flow identifier, the second state value indicating that the access terminal allocated with the service flow identifier is located in the home PAR.

12. A method for managing a service flow identifier, the method comprising:
if an access terminal performs handoff from another packet access router (PAR) to a home PAR, a PAR providing a wireless communication service to the access terminal through an access point;
when the handoff to the home PAR is performed, determining by the home PAR if a service flow identifier of the access terminal is generated by the home PAR; and
setting a timer that can measure a time before the generation of the service flow identifier,
wherein, after the allocation of the service flow identifier to the access terminal, the method deletes the stored service flow identifier and terminates the service flow identifier generation when termination of the timer is repeated for a predetermined number of times;
when it is determined that the home PAR has generated the service flow identifier, setting a storing state of the service flow identifier stored in the home PAR to a state value indicating that the access terminal is located in the home PAR,
wherein both the home PAR and the another PAR respectively manage service flow identifiers of the access terminal when the access terminal performs a handoff from the home PAR to the another PAR or when the access terminal performs a handoff from the another PAR to the home PAR, and
wherein the home PAR changes a state of the service flow identifiers of the access terminal in response to the handoff of the access terminal from the home PAR to the another PAR or from the another PAR to the home PAR, and the another PAR generates the service flow identifiers of the access terminal in response to the handoff of the access terminal from the home PAR to the another PAR or deletes the service flow identifiers of the access terminal in response to the handoff of the access terminal from the another PAR to the home PAR.

13. The method of claim 12, wherein when it is determined that the home PAR did not generate the service flow identifier, the method further comprises storing and managing the service flow identifier of the access terminal.

14. The method of claim 12, wherein the service flow identifier comprises a PAR identifier for identifying a PAR that generated the service flow identifier, and
the home PAR determines if the service flow identifier is generated by the home PAR by using the PAR identifier.

15. A method for managing a service flow identifier, the method comprising:
determining if an access terminal performs handoff from a home packet access router (PAR) to another PAR, a PAR providing a wireless communication service to the access terminal through an access point;
when the handoff to the another PAR is performed, determining by the home PAR if a service flow identifier of the access terminal is generated from the home PAR; and
setting a timer that can measure a time before the generation of the service flow identifier,
wherein, after the allocation of the service flow identifier to the access terminal, the method deletes the stored service flow identifier and terminates the service flow identifier generation when termination of the timer is repeated for a predetermined number of times;
when it is determined that the home PAR has generated the service flow identifier, setting a storing state of the service flow identifier stored in the home PAR to a state value indicating that the access terminal performed handoff to the another PAR,
wherein both the home PAR and the another PAR respectively manage service flow identifiers of the access terminal when the access terminal performs a handoff from the home PAR to the another PAR or when the access terminal performs a handoff from the another PAR to the home PAR, and
wherein the home PAR changes a state of the service flow identifiers of the access terminal in response to the handoff of the access terminal from the home PAR to the another PAR or from the another PAR to the home PAR, and the another PAR generates the service flow identifiers of the access terminal in response to the handoff of the access terminal from the home PAR to the another PAR or deletes the service flow identifiers of the access terminal in response to the handoff of the access terminal from the another PAR to the home PAR.

16. The method of claim 15, wherein when it is determined that the home PAR did not generate the service flow identifier, the method further comprises deleting the service flow identifier stored in the home PAR.

17. A method for managing a service flow identifier, the method comprising:
receiving by a home packet access router (PAR), a service flow identifier deletion request a PAR providing a wireless communication service to an access terminal through an access point;
determining by the home PAR if the deletion-requested service flow identifier is generated by the home PAR; and
when it is determined that the home PAR generated the deletion-requested service flow identifier, deleting the service flow identifier stored in the home PAR; and
setting a timer controlled by a service flow identifier controlling unit and measuring a time for preventing a service flow identifier allocation error due to system errors or an abnormal state of a radio network;
wherein both the home PAR and an another PAR respectively manage service flow identifiers of the access terminal when the access terminal performs a handoff from the home PAR to the another PAR or when the access terminal performs a handoff from the another PAR to the home PAR, and wherein the home PAR changes a state of the service flow identifiers of the access terminal in response to the handoff of the access terminal from the home PAR to the another PAR or from the another PAR to the home PAR, and the another PAR generates the service flow identifiers of the access terminal in response to the handoff of the access terminal from the home PAR to the another PAR or deletes the service flow identifiers of the access terminal in response to the handoff of the access terminal from the another PAR to the home PAR.

18. The method of claim 17, wherein the method comprises:

when it is determined that the home PAR did not generate the deletion-requested service flow identifier, requesting release of the service flow identifier from a PAR that has generated the service flow identifier;

receiving a release completion message from the PAR that has generated the service flow identifier, the release completion message indicating that the release of the service flow identifier is terminated; and deleting the service flow identifier stored in the home PAR.

19. The method of claim 18, wherein the requesting of the release of the service flow identifier comprises setting a storing state of the service flow identifier to a state value indicating that the PAR that has generated the service flow identifier has been requested by the home PAR to release the service flow identifier.

20. A method for managing a service flow identifier, the method comprising:

receiving by the home packet access router (PAR) a de-registration request from an access terminal, a PAR providing a wireless communication service to the access terminal through an access point;

determining by the home PAR if a service flow identifier of the access terminal that has received the de-registration request is generated by the home PAR; and when it is determined that the service flow identifier is generated by the home PAR, deleting the service flow identifier stored in the home PAR; and setting a timer controlled by a service flow identifier controlling unit and measuring a time for preventing a service flow identifier allocation error due to system errors or an abnormal state of a radio network;

wherein both the home PAR and an another PAR respectively manage service flow identifiers of the access terminal when the access terminal performs a handoff from the home PAR to the another PAR or when the access terminal performs a handoff from the another PAR to the home PAR, and wherein the home PAR changes a state of the service flow identifiers of the access terminal in response to the handoff of the access terminal from the home PAR to the another PAR or from the another PAR to the home PAR, and the another PAR generates the service flow identifiers of the access terminal in response to the handoff of the access terminal from the home PAR to the another PAR or deletes the service flow identifiers of the access terminal in response to the handoff of the access terminal from the another PAR to the home PAR.

21. The method of claim 20, wherein the method comprises:

when it is determined that the home PAR did not generate the service flow identifier, requesting release of the service flow identifier from a PAR that has generated the service flow identifier;

receiving a release completion message from the PAR that has generated the service flow identifier, the release completion message indicating that the release of the service flow identifier is completed; and deleting the service flow identifier stored in the home PAR.

* * * * *